United States Patent [19]

Miyatake et al.

[11] Patent Number: 5,267,034
[45] Date of Patent: Nov. 30, 1993

[54] CAMERA WORK DETECTING METHOD

[75] Inventors: Takafumi Miyatake, Hachioji; Hirotada Ueda, Kokubunji; Satoshi Yoshizawa, Kawasaki, all of Japan

[73] Assignee: Institute for personalized information environment, Tokyo, Japan

[21] Appl. No.: 840,825

[22] Filed: Feb. 25, 1992

[30] Foreign Application Priority Data

Mar. 11, 1991 [JP] Japan .................. 3-070475

[51] Int. Cl.⁵ .............. H04N 7/18; H04N 5/225; G06F 15/70
[52] U.S. Cl. .................. 358/105; 358/136; 358/222
[58] Field of Search .................. 358/105, 136, 222

[56] References Cited

U.S. PATENT DOCUMENTS

| | | | |
|---|---|---|---|
| 4,677,476 | 6/1987 | Kondo | 358/105 |
| 4,862,264 | 8/1989 | Wells | 358/136 |
| 4,924,310 | 5/1990 | von Brandt | 358/136 |
| 5,006,929 | 4/1991 | Barbero | 358/136 |
| 5,053,876 | 10/1991 | Blissett | 358/222 |
| 5,067,014 | 11/1991 | Bergen | 358/105 |
| 5,083,860 | 1/1992 | Miyatake | 352/129 |
| 5,107,293 | 4/1992 | Sekine | 358/222 |

FOREIGN PATENT DOCUMENTS

| | | |
|---|---|---|
| 0180446 | 7/1986 | European Pat. Off. . |
| 0358196 | 3/1990 | European Pat. Off. . |
| 0425288 | 2/1991 | European Pat. Off. . |
| 2220319 | 4/1990 | United Kingdom . |

Primary Examiner—Howard W. Britton
Attorney, Agent, or Firm—Antonelli, Terry, Stout & Kraus

[57] ABSTRACT

A motion picture image editing method and in particular, a method for detecting such camera works as zooming and panning motions from a motion picture image stored in video tape or the like. In this method, a motion picture image constituted by a plurality of consecutive picture images on every frame basis, and on time series basis and on the basis of a correlation value for a displacement between the frames at a typical point determined for each of small blocks constituting the motion picture image, a motion vector for each of the small blocks is detected. Then a first motion parameter for estimation of a motion of a camera is generated with use of the motion vector detected at corresponding one of the typical points of first one of the frames. Or the first motion parameter for estimation of the motion of the camera is generated with use of a combination of the motion vector and a position vector at corresponding one of the typical points of a second frame inputted previous by one frame to the first frame. Further, the first motion parameters for the respective frames are found, the found first motion parameters are integrated until an integrated value exceeds a predetermined allowable value, and the integrated value is averaged through an integration period to calculate a second motion parameter for determination of the camera motion for the integration period. Finally, the camera motion is detected on the basis of the second motion parameter.

5 Claims, 10 Drawing Sheets

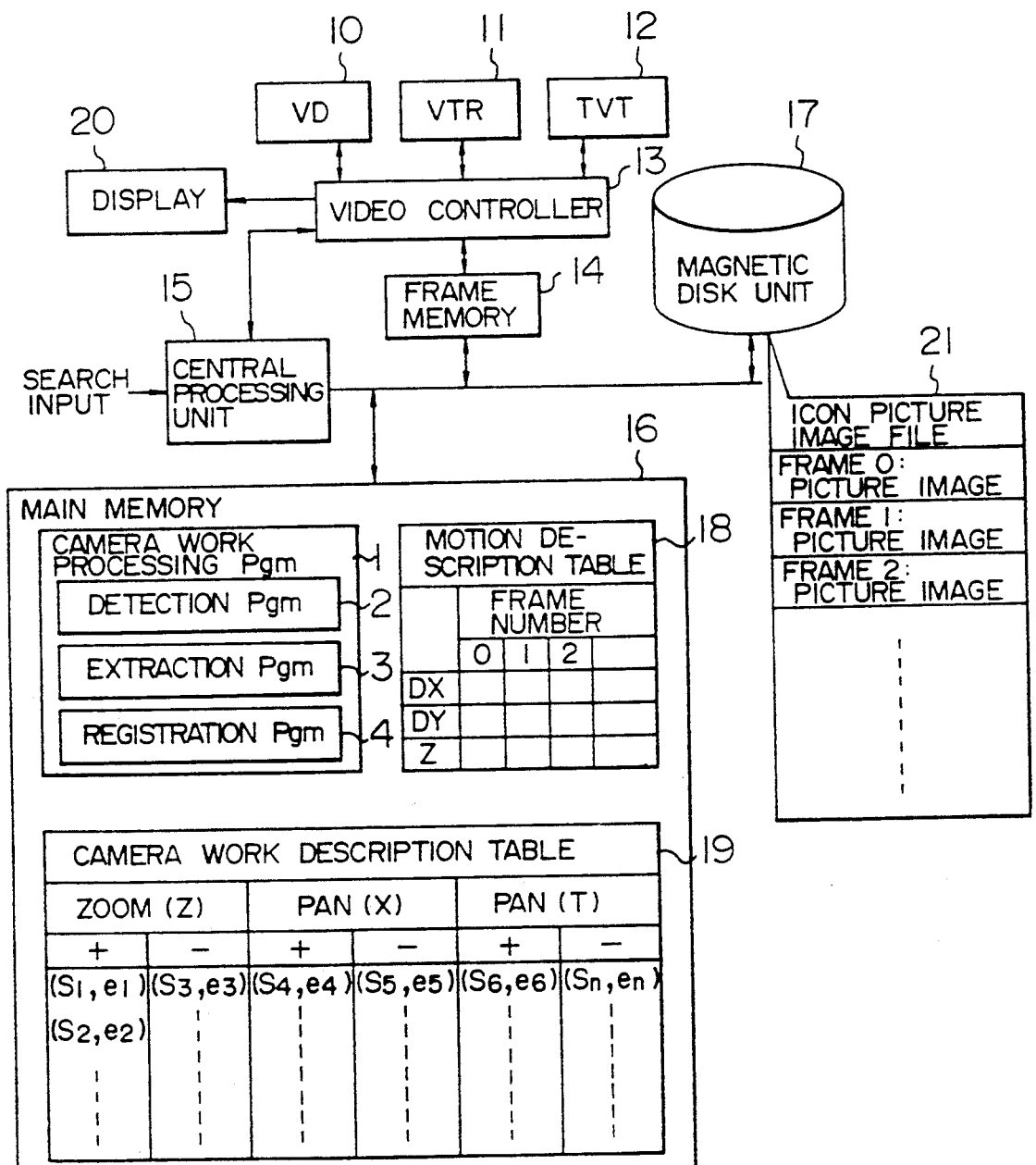
F I G. 1

CAMERA WORK DETECTING METHOD

BACKGROUND OF THE INVENTION

The present invention generally relates to a method for describing the incidental data of motion picture image scenes necessary at the time of editing video or movie picture images and, more particularly, to a camera work detecting method for retrieving a target motion picture image frame from a motion picture image stored in video tape or video disk to realize efficient picture image editing.

There is disclosed a prior art editing technique for automatically detecting a change point in a picture image from a motion picture image stored in video tape or the like to detect a scene transition and thereby facilitate the tape-head searching operation during editing of the motion picture image, in U.S. Pat. No. 5,083,860 by the same applicant as the present application. This editing system, with use of incidental data on the motions of a video camera itself, i.e., on such camera works as zooming and panning motions of the video camera for each detected scene, can support such a motion-picture image retrieving work, for example, as "want to see a scene that panning is carried out from right to left" or "want to see a scene immediately after zooming up" or such a motion-picture image editing work as, for example, "want to correct the irregular panning speed" or "want a higher panning speed". To this end, a technique for detecting such camera works as the zooming and panning motions of the video camera and for automatically describing incidental data indicative of such motions is required.

Examples of such known techniques for detecting the motions of a video camera itself are disclosed in an article titled "DIFFERENTIAL ESTIMATION OF THE GLOBAL MOTION PARAMETERS ZOOM AND PAN" in a magazine "SIGNAL PROCESSING" 16 (1989) and in JP-A-2-157980.

The former is directed to presentation of basic analysis models for zooming and panning motions, while the latter is directed to correction of an unintentional picture image movement. In the above JP-A-2-157980, a plurality of, e.g., 4 or so of relatively large detection zones are set on a display screen, a motion vector between frames is found on the basis of a correlation value based on a predetermined displacement, and the motion vector on the display screen is determined on the basis of the state of the correlation value and the reliability judgement result of a previous motion vector. A motion vector based on the vibration of the video camera vibrates around a zero vector and when a moving object appears on the display screen, the motion vector is found by adding together the motion of the moving object and the motion of the video camera. The then motion vector corresponds to an addition of the motion vector based on the vibration and a constant value. Accordingly, the motion vector based on the vibration can be separated and thus the unintentional undesirable picture image movement based on the vibration of the video camera can be corrected on the basis of only the motion vector based on the vibration.

According to the prior art techniques, a motion vector indicative of a slow motion of a camera itself cannot be accurately detected, which results in that such camera works as panning and zooming motions cannot be automatically detected, thus disabling efficient picture editing operation.

More in detail, the system disclosed in JP-A-2-157980 is intended to detect the vibration of the video camera and fails to pay any consideration to the detection of such camera works as panning and zooming motions. For example, a picture image obtained when the video camera is panned from right to left is judged as a moving object appearing on the display screen and cannot been regarded as a camera motion. Further, a picture image obtained when the camera is zoomed up or down is detected as motion vectors pointed radially from the center of the screen. However, a means for converting the detected motion vectors into a zooming magnification value is not provided in the system. Furthermore, the panning or zooming motion of the video camera is slower in speed than the undesirable hand movement of the camera operator. For this reason, the aforementioned system for determining a motion on the screen through one motion, detection cannot provide a sufficient detection accuracy.

SUMMARY OF THE INVENTION

It is an object of the present invention to provide a camera work detecting method which can solve the above problems in the prior art, can detect a motion in a camera from a picture image obtained when the camera is panning or zooming at a slow speed, can automatically retrieve a change point in an intended panning or zooming motion to realize efficient picture editing operation.

In order to attain the above object, a camera work detection system in accordance with the present invention comprises the steps of inputting a motion picture image constituted by a plurality of consecutive picture images on every frame basis and on time series basis and on the basis of a correlation value for a displacement between the frames at a typical point determined for each of small blocks constituting the motion picture image, detecting a motion vector for each of said small blocks; generating a first motion parameter for estimation of a motion of a camera with use of either one of the motion vector detected at corresponding one of the typical points of first one of the frames and a combination of the motion vector and a position vector at corresponding one of the typical points of a second frame inputted previous by one frame to the first frame; finding the first motion parameters for the respective frames and integrating the found first motion parameters until an integrated value exceeds a predetermined allowable value; averaging the integrated value through an integration period and calculating a second motion parameter for determination of the camera motion for the integration period; and detecting the camera motion on the basis of the second motion parameter.

In the present invention, in order to automatically describe data on a zooming or panning motion indicative of a change in a camera work for each frame, a parameter (first motion parameter) indicative of the rotation of the camera as well as a parameter (first motion parameter) indicative of a photographing magnification based on a lens motion are estimated. For example, the estimation of the camera rotation motion parameter is carried out with use of the motion vectors of the blocks of the motion picture image inputted on time series basis for each frame, whereas the estimation of the photographing magnification based on the camera lens motion is carried out with use of the motion vectors and a position vector as a typical point. Further, the estimated parameters are integrated for each frame and the estimating and integrating operations are repeated until the integrated motion parameter exceeds a predetermined allowable value. When the integrated motion parameter exceeds the predetermined value, the integrated value is averaged by its integration period and the obtained average value is set as a formal motion vector (second motion vector) for the integration period. As a result, even when the camera work is carried out at a slow speed, motion vectors necessary for detecting the camera work can be obtained.

Further, the motion vectors of ones of the blocks having non-uniform patterns are extracted at the time of estimating the first motion parameter, whereby blocks having high erroneous detection possibilities are previously eliminated. The estimation of the motion parameters is carried out by finding statistical deviations of the directions and magnitudes of motion vectors in a plurality of blocks, whereby even such motion vectors out of the allowable range as deviated by a quantization error or noise from their original direction can be previously removed.

In addition, the reliable data of the panning and zooming camera motions thus obtained can be automatically stored on every frame basis. And on the basis of these stored data, a change point in an intended panning or zooming motion can be retrieved and efficient picture editing can be realized.

BRIEF DESCRIPTION OF THE DRAWINGS

FIG. 1 is a general block diagram of a system for detecting a camera work in accordance with an embodiment of the present invention;

DESCRIPTION OF THE PREFERRED EMBODIMENTS

Figure 2:
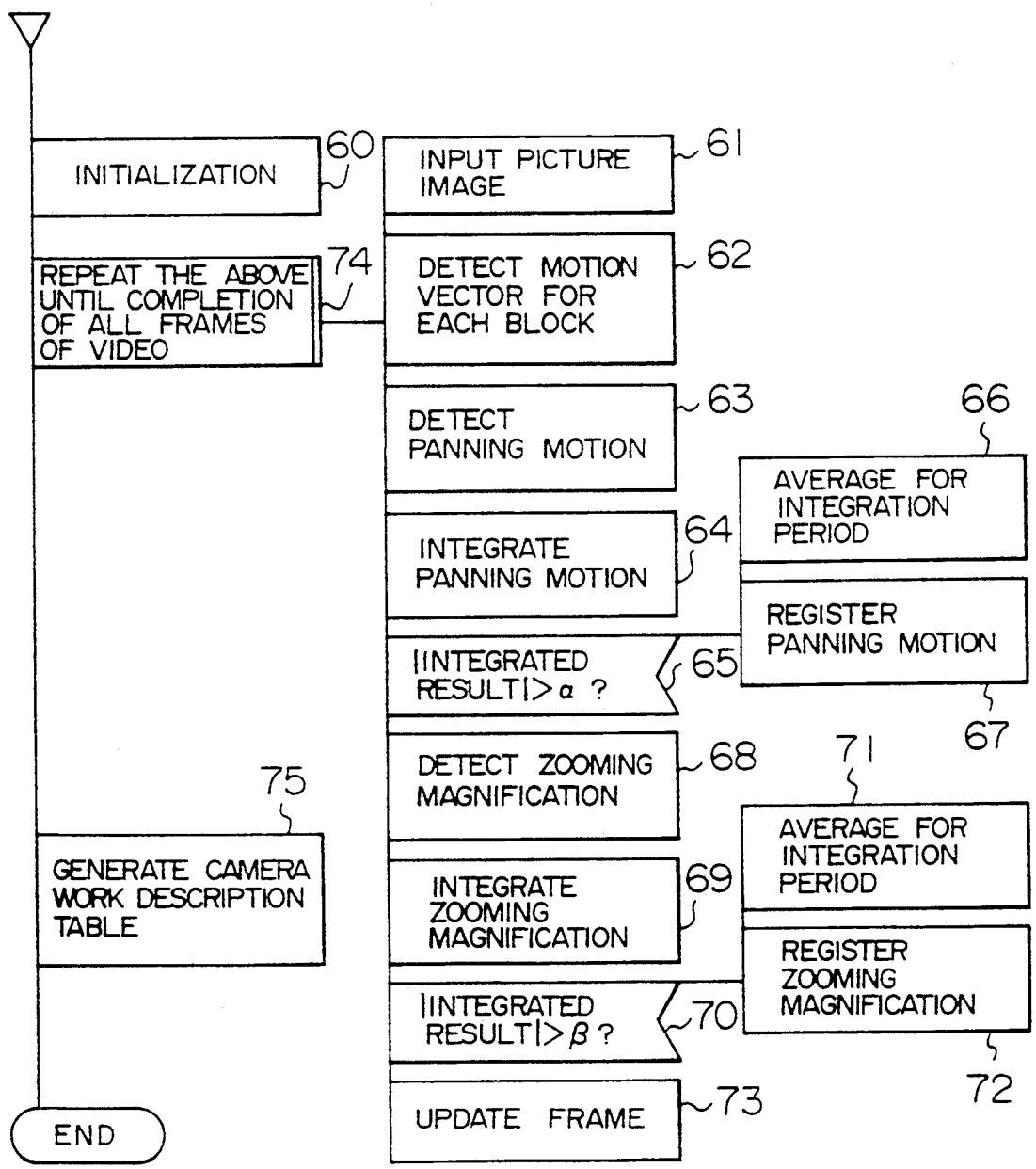
FIG. 2 is a flowchart for explaining the camera work detecting operation of the system of FIG. 1.

An embodiment of the present invention will be explained in detail with reference to the accompanying drawings.

Referring first to FIG. 1, there is shown a general block diagram of a system for detecting a camera work for motion picture images in accordance with an embodiment of the present invention.

The camera work detecting system of the present embodiment includes a video disk recorder (which is abbreviated to "VD" in FIG. 1) 10 for sequentially recording video data, a video tape recorder (which is abbreviated to "VTR" in FIG. 1) 11, and a television tuner (which is abbreviated to "TVT" in FIG. 1) 12 for receiving picture images being transmitted (broadcast) from broadcasting stations at a constant rate on a one-way basis, these devices 10, 11 and 12 form a motion picture image input/output apparatus. Further included in the camera work detecting system are a video controller 13 for performing control over the motion picture image input/output apparatus and switching operation to an input destination, a frame memory 14 for storing therein motion picture images on every frame basis, a central processing unit 15 for performing general control over the system, a main memory 16 for storing therein programs and data to be executed and used in the central processing unit 15, a magnetic disk unit 17 as an external memory for supplement of the capacity of the main memory 16, and a display 20.

More specifically, the main memory 16 further comprises a camera work detection/registration programs (which is abbreviated to "CAMERA-WORK PROCESSING Pgm" in FIG. 1) 1 and a motion description table 18. The camera work detection/registration programs 1 has a motion-picture detection program (which is abbreviated to "DETECTION Pgm" in FIG. 1) 2 for detecting a motion vector from a motion picture image stored in the frame memory 14, a motion-parameters extraction program (which is abbreviated to "EXTRACTION Pgm" in the same drawing) 3 for extracting motion parameters (i.e., first and second motion parameters) indicative of pan and zoom motions from the detected motion vector, and a registration program (which is abbreviated to "REGISTRATION Pgm" in the drawing) 4 for registering the extracted motion parameters indicative of the pan and zoom motions in the motion description table 18. The central processing unit 15 performs its camera-work detecting and registering operation which form a major part of the present invention under control of the aforementioned camera-work detection/registration programs 1. The main memory 16 also has a camera-work description table 19. Combinedly described in the camera-work description table 19 are the respective camera works of zoom (Z) "+" (zoom-in), zoom (Z) "−" (zoom-out), pan (X) "+" (from right to left), pan (X) "−" (from left to right), pan (Y) "+" (from top to bottom) and pan (Y) "−" (from bottom to top) of a data obtained from the aforementioned motion description table 18 and expressed in the form of (start frame Si, end frame Ei) calculated in the central processing unit 15.

The video disk recorder 10 records video data sequentially but the recorded data can be accessed in a random access manner. Further, the video tape recorder 11 sequentially records video data, the recorded data are accessed in a sequential access manner, but slow reproduction is possible. The television tuner 12 cannot record any data therein and receives picture images transmitted (broadcast) from broadcasting stations at a constant rate on one-way basis.

The video controller 13 performs various sorts of control over the motion-picture image input/output apparatus, that is, over the video disk recorder 10, video tape recorder 11 and television tuner 12, and is switchedly connected to one of these devices 10, 11 and 12 as its input destination to receive motion picture images therefrom and temporarily store them in the frame memory 14 on every frame basis.

And the central processing unit 15, in accordance with the camera-work detection/registration programs 1, analyzes the motion of a motion picture image read out from the frame memory 14, and describes in the motion description table 18 of the main memory 16 the analyzed intermediate data such as, for example, the motion data of the motion picture image in a scene between cut transitions, that is, the camera work (pan and zoom) data of the motion picture image on every frame basis. In this connection, the motion description table 18 may be provided even in the magnetic disk unit 17 so that the camera work data is once stored in the main memory 16 and then registered in the magnetic disk unit 17.

The magnetic disk unit 17 also contains an icon picture image file 21 in which scene icons indicative of incidental data to various camera works to be detailed later in connection with FIGS. 18A to 18D are stored.

In this way, the camera work detection system of the present embodiment includes no special hardware configuration and thus can be easily configured with use of such devices as an acoustic video (AV) apparatus and a workstation. Detailed explanation will be made in the following as to the processing operation of the camera work detection system in accordance with the present embodiment of the present invention.

Shown in FIG. 2 is a flowchart showing the camera work detecting operation of the central processing unit in FIG. 1 in accordance with the present invention.

That is, the flowchart shows the detecting operation of motion parameters in camera works and the describing operation of the motion of the detected motion picture image in every frame in the central processing unit 15 of FIG. 1.

In more detail, various variables are initialized in an initializing step (box 60). The details of the initializing operation will be explained in connection with FIG. 6. Then in a picture image input step (box 61), one frame of motion picture image (i.e., first frame) is fetched in the frame memory 14. Assuming that the then picture image denotes $P_n$, then the frame memory 14 previously stores a picture image $P_{n-1}$ previous by one frame (i.e., second frame) therein. In a motion vector detecting step (box 62), the picture image is divided into a multiplicity of blocks and motion vectors (i.e., first motion parameters) for the divided blocks are calculated to find a motion vector for a point indicative of the center of the blocks. This motion-vector detecting operation will be detailed later in connection with FIG. 7. With use of the motion vectors calculated for the divided blocks, the central processing unit 15, performs its detecting and registering operation over the pan and zoom motions of the present invention under control of the camera-work detection/registration programs 1 in FIG. 1.

That is, in a pan motion detecting step (box 63), the motion vectors of the respective divided blocks are statistically processed to remove abnormal motion vectors and to calculate pan motion parameters. This enables the reliability of the detected motion vector to be enhanced. The details of the pan motion detecting operation will be described later in connection with FIG. 8. In an integrating step (box 64), next, the pan motion parameters are subjected to an integrating operation for each frame. This allows even a slow pan to be accurately detected. The integrating operation will be detailed later in connection with FIG. 9.

Further, in a judgement box 65, it is detected whether or not the absolute value of the integrated result exceeds a predetermined threshold value $\alpha$. When the absolute value of the integrated result exceeds the predetermined threshold value, control goes to an averaging step (box 66) where the integrated result is divided by the number of frames present in the integration period to find an average value in the integration period. In a pan motion registering step (box 67), the average pan motion parameters (i.e., second motion parameters) are written in the motion description table 18 of the main memory 16. After completion of the registering operation, various sorts of variables are previously initialized for the next integrating operation. The averaging operation in the integration period and the pan motion registering operation will be detailed later in conjunction with FIGS. 10 and 11.

In a zoom magnification detecting step (box 68), next, the motion vectors and positional vectors obtained for the respective blocks are statistically processed to remove abnormal motion vectors and to calculate zoom magnification parameters. This zoom motion detecting operation will be detailed later in connection with FIG. 12. In an integrating step (box 69), further, the calculated zoom magnification parameters are subjected to an integrating operation for each frame. As a result, even slow zooming can be accurately detected. The integrating operation will be detailed later in connection with FIG. 13. Under no zoomed condition, since the magnification parameter is "0", the integrating operation uses the value "0" of the magnification parameter for use in the next processing. In a judgement box 70, it is judged whether or not the integrated result exceeds a predetermined threshold value $\beta$. When the integrated result exceeds the predetermined threshold value, an average zoom magnification parameter is found in the integration period and registered in the motion description table 18 in FIG. 1. That is, in an averaging step (box 71), the average zoom magnification parameter is is found by dividing the integrated result by the number of frames required in the integration period and then written, in a zoom magnification registering step (box 72), in the motion description table 18 of the main memory 16 in FIG. 1.

After completion of the registering operation, the various variables are previously initialized for the next integrating operation. The averaging operation in the integration period and the zoom magnification registering operation will be detailed later in conjunction with FIGS. 14 and 15.

After the pan motion registering operation and zoom magnification registering operation corresponding to one frame are completed in this way, frame updating operation is carried out in a frame updating step (box 73) so that the operations from the box 61 to the box 72 are repeated to perform the pan motion registering operation and zoom magnification registering operation for the next frame. In the case where the motion description table 18 in FIG. 1 is stored in the main memory 16 in FIG. 1, if the number of frames becomes large, then the table 18 may be stored in the magnetic disk 17 as an external memory in FIG. 1.

After the aforementioned operations are repetitively carried out with respect to all the frames of the video signal in this way (box 74), the central processing unit 15 generates the camera work description table 19 based on the description contents of the generated motion description table 18 with respect to all the frames.

Explanation will next be made as to how to detect pan and zoom motions, how to generate the motion description table 18 and how to handle the icon picture image file associated therewith.

Figure 3:
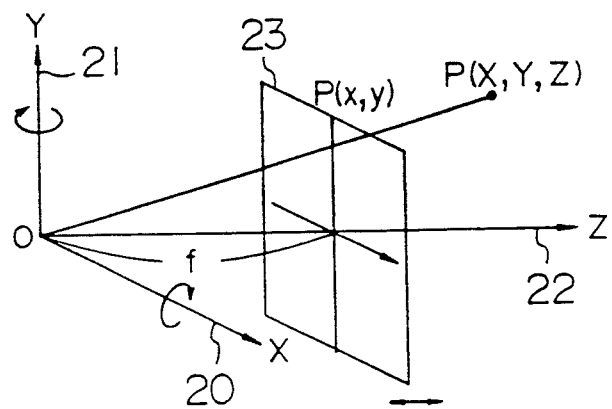
FIG. 3 is an example of a perspective transformation model for a camera work to be detected by the system of FIG. 1.

FIG. 3 is a diagram showing an embodiment of a perspective transformation model of a camera work to be detected by the camera work detection system of FIG. 1.

In FIG. 3, reference numerals 20, 21 and 22 denote three X, Y and Z axes in three-dimensional orthogonal coordinate system respectively, numeral 23 denotes a picture image plane which has an origin o through which the Z axis 22 is passed to be perpendicular to the plane 23. Reference symbol f represents a distance between the origin O of the orthogonal coordinate system and the picture image plane 23, which distance is called a focal length. The origin 0 is called a viewing point. In this perspective transformation model, a spatial point P (X, Y, Z) is projected on the picture image plane 23 at an intersection point p corresponding to a crossing between a line connecting the point P and the origin 0 and the plane 23. Assuming the point p has picture image coordinates (x, y), then the following equations are satisfied.

$$x = (f \times X) \div Z, \; y = (f \times Y) \div Z \quad (1)$$

With this mode, a camera work called a pan corresponds to a rotating movement of the X axis 20 or Y axis 21, while a camera work called a zoom corresponds to a parallel displacement of the picture image plane 23 along the Z axis 22. Explanation will first be made as to a pan movement, for example, the rotating movement of the Y axis 21.

Figure 4A:
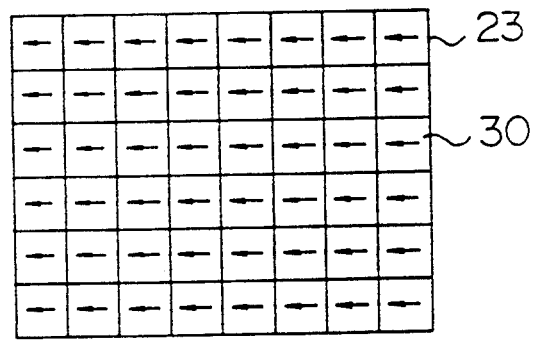
FIGS. 4A and 4B show an example of panning motion detecting operation.
Figure 4B:
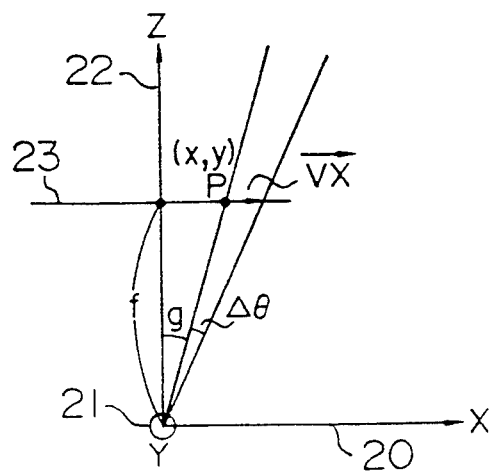

Referring to FIGS. 4A and 4B, there are shown diagrams for explaining an example of the pan motion detecting operation of the camera work detection system of FIG. 1.

More specifically, FIGS. 4A and 4B show exemplary motion vectors on the picture image plane 23 when the pan motion is carried out around the Y axis 21, wherein FIG. 4A shows the motion vectors (shown by arrows in the drawing) for respective blocks 30 which vectors have substantially the same size and also are pointed in the same direction and FIG. 4B shows a motion vector v (vx, vy) starting from the p (x, y) when the coordinate system is rotated around the Y axis 21 by an angle of $\Delta\theta$.

In this case, a motion vector component vx of the motion vector v in the X axis direction is expressed as follows.

$$vx = f \times (\tan(\theta + \Delta\theta) - \tan\theta) \quad (2)$$

where $\theta$ denotes an angle between a position vector of the point p with respect to the origin O and a YZ plane and $\tan\theta = x \div f$ is satisfied. The equation (2) is reduced into the following equation (3).

$$vx = f \times ((\tan\theta + \Delta\theta) \div (1 - \tan\theta \times \tan\Delta\theta) - \tan\theta) \quad (3)$$

When the focal length f is sufficiently larger than the size of the picture image plane 23, the equation (3) is approximated as follows.

$$vx \approx f \times \tan\Delta\theta \quad (4)$$

Hence, by finding the motion vector v, the rotary speed of the camera can be directly obtained.

Next, explanation will be directed to the parallel displacement of the picture image plane 23 along the Z axis 22.

Figure 5:
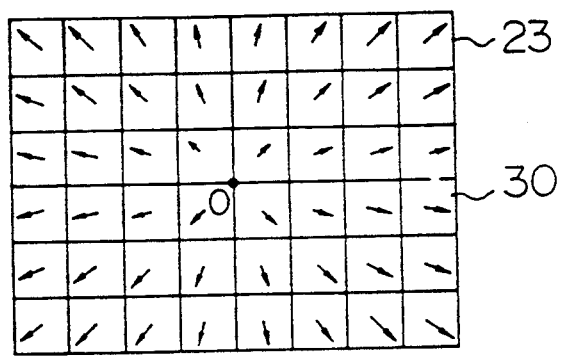
FIG. 5 is an example of zooming motion detecting operation.

Shown in FIG. 5 is a diagram for explaining an example of the zoom motion detecting operation of the camera work detection system of FIG. 1.

More specifically, FIG. 3 shows an example of motion vectors on the picture image plane 23 when the plane 23 is parallelly displaced from the origin O to the direction of the Z-axis 22 by a displacement of $\Delta f$, in which the motion vectors of the respective blocks 30 pointed radially from the picture image origin o become larger in magnitude in proportion to their distance from the picture image origin o. A zoom magnification z is given as follows.

$$z = (f + \Delta f) \div f \quad (5Z)$$

With the perspective transformation model of FIG. 3, the zoom magnification z is also expressed as follows, in terms of the absolute value of a position vector pv1 (x1,y1) for the point p on the picture image plane with the focal length of f and the absolute value of a position vector pv2 (x2,y2) for the point p with the focal length of (f+$\Delta$f).

$$z = \|pv2\| \div \|pv1v \quad (6)$$

The equation (6) is further given as follows, in terms of the motion vector v for the point p on the picture image plane.

$$z = \|pv1 + v\| \div pv1v \quad (7)$$

In the present embodiment, since the motion vector v has a possibility of containing an error based on noise, the zoom magnification z is designed to have components having the same direction as the position vector pv1 as follows.

$$z = ((\|pv1\|) + (v \cdot pv1 / \|pv1\|)) \div \|pv1\| \quad (8)$$

where a value (z − 1) obtained by subtracting one from z is used as the zoom magnification, since a center value of the value z is one.

Detailed explanation will then be directed to the respective processing boxes of FIG. 2 in the camera work detection system of FIG. 1.

Figure 6:
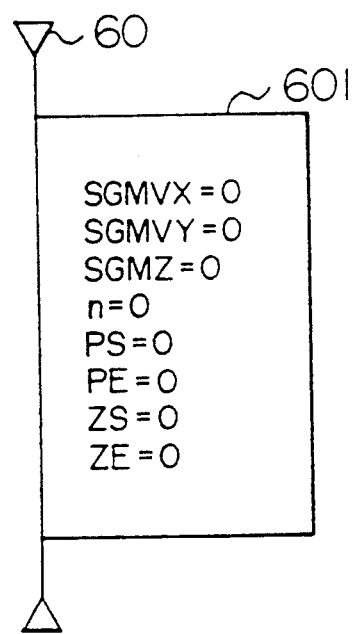
FIG. 6 is a detailed example of initializing operation in FIG. 2.

FIG. 6 is a flowchart showing a specific example of the initializing operation in FIG. 2.

More specifically, in a box 601, the initial values of the various variables are reset all at zero. That is, all reset at "0" are variables SGMVX and SGMVY indicative of a work area for integration of pan motion parameters, a variable SGMZ indicative of a work area for integration of zoom magnifications, a variable n indicative of a frame number, variables PS and PE indicative of frame numbers at the start and end points of the integration period of the pan motion parameter, and variables ZS and ZE indicative of frame numbers at the start and end points of the integration period of the zoom magnification motion parameter.

Figure 7:
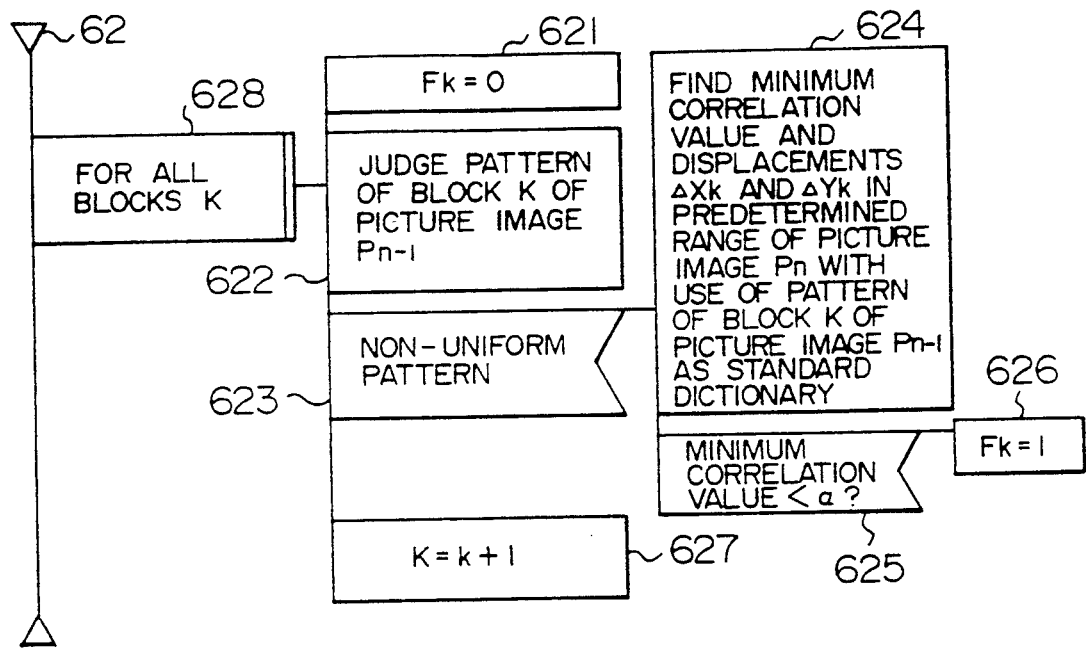
FIG. 7 is a detailed example of motion vector detecting operation in FIG. 2.

Referring to FIG. 7, there is shown a flowchart for explaining a specific example of the motion vector detecting operation in FIG. 2.

In more detail, in a box 621, a motion vector detection flag Fk is first reset at "0". This is a state in which no motion vector is not detected in a block k. It is judged in a box 622 whether or not the block k is suitable for the motion vector detection. In other words, since a correlation value based on pattern matching is used for the motion vector detection in the present invention, such a pattern as uniform in density in a block is low in reliability even when the correlation value is good. For this reason, it is previously checked whether or not the block contains vertical, horizontal and oblique pattern components higher than a predetermined value.

In a block 623, it is checked whether or not the block contains vertical, horizontal and oblique pattern components higher than a predetermined value and the pattern is non-uniform. The judgement of the nonuniform pattern causes control to go to a block 624 to detect the motion vector based on pattern matching. More specifically, in the block 624, a minimum correlation value Min and then displacements $\Delta Xk$ and $\Delta Yk$ in the picture image Pn are found with use of the pattern of the block k of the picture image $P_{n-1}$ previous by one frame as a standard dictionary. In a block 625, it is judged whether or not the minimum correlation value is smaller than a threshold value $\gamma$. When the minimum correlation value is smaller than the threshold value, the motion vector detection flag Fk is set to be "1" in a block 626 so that the motion vector for the block k is obtained.

When the above operations are applied to all the blocks k, a multiplicity of motion vectors are obtained for the respective blocks of the picture image. In this way, in the present embodiment, since check is carried out on the pattern of the block prior to the acquisition of the motion vector, highly reliable motion vectors can be obtained. Further, since motion detection is carried out based on the pattern matching, the camera work detection system can be operated stably even with noises.

Figure 8:
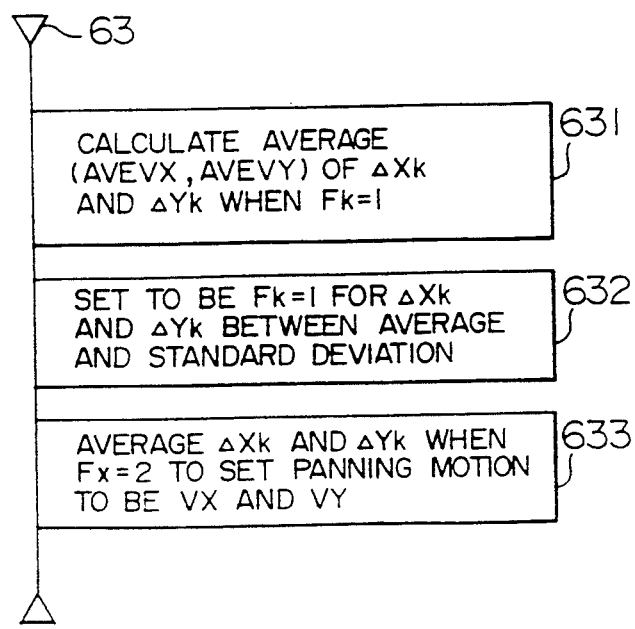
FIG. 8 is a detailed example of panning motion detecting operation in FIG. 2.

Shown in FIG. 8 is a flowchart for explaining a specific example of the pan motion detecting operation in FIG. 2.

More specifically, in a block 631, an average (AVEVX, AVEVY) of the motion vectors obtained for the respective blocks and a standard deviation (STVX, STVY) are first calculated in a block 631. Then in a block 632, motion vectors present between the average and the standard deviation are found on the basis of the motion vectors of the respective blocks. In a next block 633, an average of the motion vectors present between the average and standard deviation is found and set to be a pan motion vector (VX, VY). In this way, in the present embodiment, since not a simple averaging operation but such an averaging operation as without using abnormal motion vectors removed is carried out, the obtained motion vectors can be high in reliability. Further, even when a moving object appears on the display screen, the camera work detection system cannot be influenced by the moving object so long as the object is less than half of the full size of the display screen.

Figure 9:
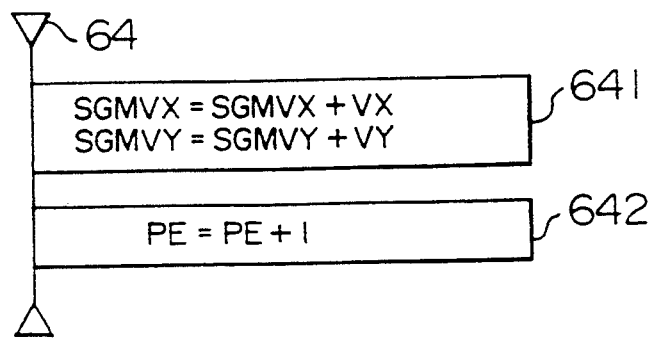
FIG. 9 is a detailed example of panning-motion integrating operation in FIG. 2.

FIG. 9 shows a flowchart for explaining a specific example of the pan motion integrating operation in FIG. 2.

More specifically, in a block 641, an integrated result is stored in the SGMVX and SGMVY and in a block 641, the frame at the end point of the integration period is updated by one frame and then stored in a variable PE.

Figure 10:
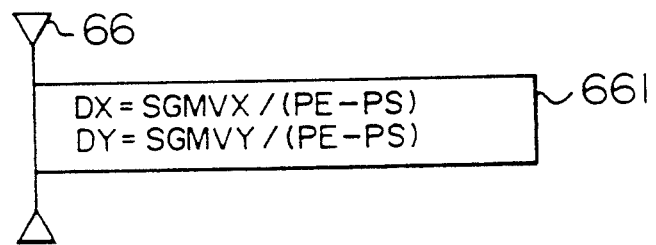
FIG. 10 is a detailed example of averaging operation for a panning integration period in FIG. 2.

A specific example of the averaging operation for the pan integration period in FIG. 2 is shown by a flowchart in FIG. 10.

More specifically, in a block 661, the SGMVX and SGMVY are divided by the integration period (PE - PS) and the pan motion parameters are stored in variable DX and DY.

Figure 11:
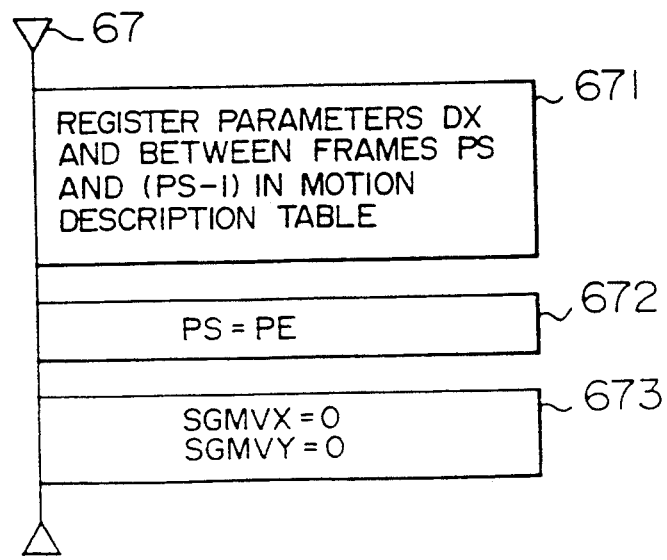
FIG. 11 is a detailed example of panning motion registering operation in FIG. 2.

FIG. 11 is a flowchart for explaining a specific example of the pan motion registering operation in FIG. 2.

In more detail, in a block 671, the variables DX and DY are registered in corresponding DX and DY terms between the frame periods PS and (PE−1) in the motion description table 18 in FIG. 1. Then, in a block 672, for the initialization of the next integration period, the contents of the variable PE is substituted for the variable PS. In a next block 673, for the initialization of the next integration, the variables SGMVX and SGMVY are reset both at "0".

Figure 12:
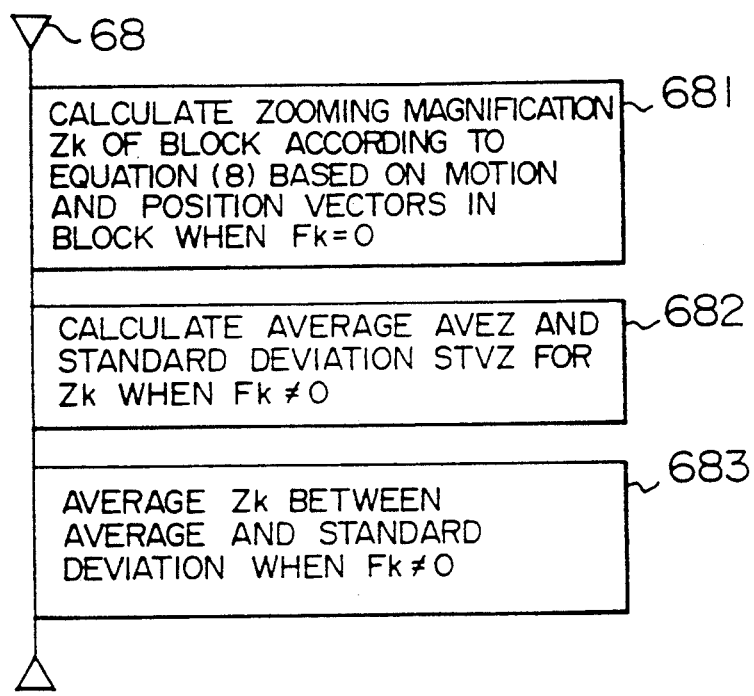
FIG. 12 is a detailed example of zooming magnification detecting operation in FIG. 2.

Shown in FIG. 12 is a flowchart for explaining a specific example of the zoom magnification detecting operation in FIG. 2.

Concretely, in a block 681, the zoom magnification Zk is calculated in accordance with the equation (8) with use of the position vectors at the center points of the respective blocks and the corresponding motion vectors. In this case, when the motion vector direction is remarkably shifted from the corresponding position vector direction, the the motion vector is judged as an abnormal one and is not subjected to the zoom magnification calculation. The zoom magnification Zk becomes larger than the value 0 during zooming up and becomes smaller than the value 0 during zooming down. In a next block 682, an average of the zoom magnifications Zk obtained for the respective blocks and a standard deviation thereof are calculated and then stored in variables AVEZ and STVZ respectively. in a block 683, the averaging operation is carried out with respect to only ones of the zoom magnifications Zk of the respective blocks present between the average and the standard deviation to obtain a zoom magnification Z. In this way, in the present embodiment, since not a simple zoom averaging operation but such an averaging operation as without using abnormal zoom magnifications removed is carried out, the obtained zoom magnifications can be high in reliability. Further, as in the case of the pan detection, even when a moving object appears on the display screen, the camera work detection system cannot be influenced by the moving object so long as the object is less than half of the full size of the display screen.

Figure 13:
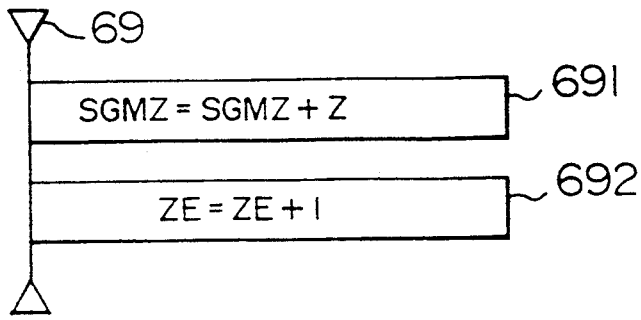
FIG. 13 is a detailed example of zooming magnification integrating operation in FIG. 2.

FIG. 13 is a flowchart for explaining a specific example of the zoom magnification integrating operation in FIG. 2.

In more detail, in a block 691, the integrated result is stored in the variable SGMZ. In a next block 692, the frame at the end point of the integration period is updated by one frame and stored in the variable ZE.

Figure 14:
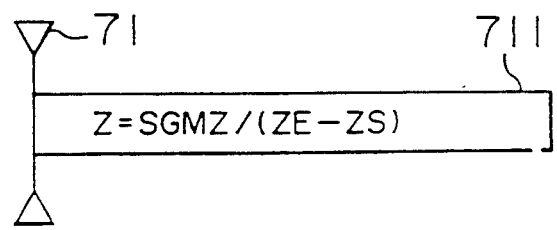
FIG. 14 is a detailed example of averaging operation for a zooming integration period in FIG. 2.

Referring to FIG. 14, there is shown a flowchart for explaining a specific example of the averaging operation of the zoom integration period in FIG. 2.

More concretely, in a block 711, the SGMZ is divided by the integration period (ZE - ZS).

Figure 15:
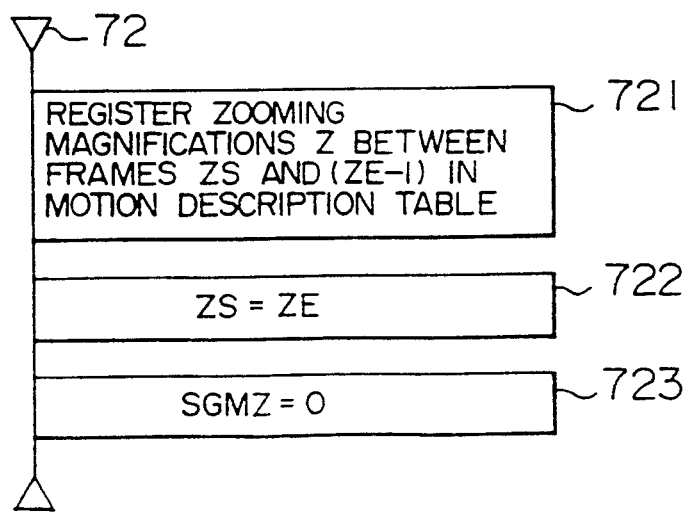
FIG. 15 is a detailed example of zooming magnification registering operation in FIG. 2.

FIG. 15 is a flowchart for explaining a specific example of the zoom magnification registering operation in FIG. 2

More specifically, in a block 721, the variable Z is registered in corresponding Z terms between the frame periods ZS and (ZE−1) in the motion description table 18 in FIG. 1. In a next block 722, for the initialization of a next integration period, the contents of the variable ZE is substituted for the variable ZS. In a block 723, for the initialization of the next integration, the variable SGMZ is reset at "0".

Figure 16:
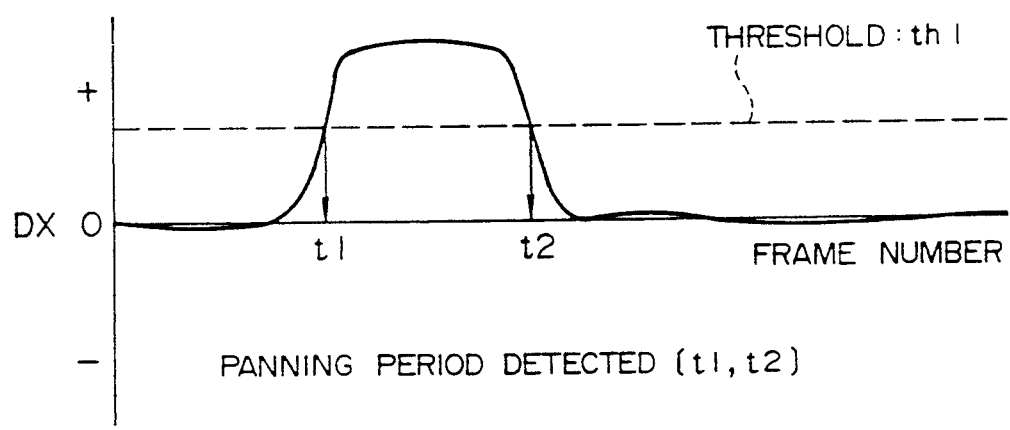
FIG. 16 is a diagram for explaining the principle of detecting a panning period.

On the basis of the above processing results, the central processing unit 15 generates the camera work description table 19 in the box 75. FIG. 16 illustrates how to detect a panning period on the basis of the data DX in the motion description table 18. In FIG. 16, a horizontal axis denotes frame number and a vertical axis denotes the value of the motion parameter DX in the motion description table. In detection of such a panning period as, for example, the camera pans from right to left, there is obtained such a DX characteristic diagram swelling toward its plus side as shown in FIG. 16. For the detection of the right-to-left panning period, for example, a positive threshold value th1 is set and such detection is achieved by finding a period exceeding the threshold th1. In the example of FIG. 16, the obtained period is [t1, t2] and thus the value t1 is written in a panning start frame s3 in a column Pan (X) "+" of the camera work description table of FIG. 1 while the value t2 is written in a panning end frame e4 therein. Conversely, in detection of such a panning period as, for example, the camera pans from left to right, there is obtained such a DX characteristic diagram as to swell toward its minus side in FIG. 16. In this case, as in the above case, a negative threshold value th1 is set and a corresponding period is obtained by finding a period smaller than the threshold. In this case, the values of the obtained period are written in panning start frames s5 and e5 in a column Pan (X) "−" of the camera work description table of FIG. 1.

Similarly, with respect to a vertically panning period, the values of a top-to-bottom panning period are written in corresponding frames of the column Pan (Y) "+" while the values of a bottom-to-top panning period are written in corresponding frames of the column Pan (Y) "−".

Figure 17:
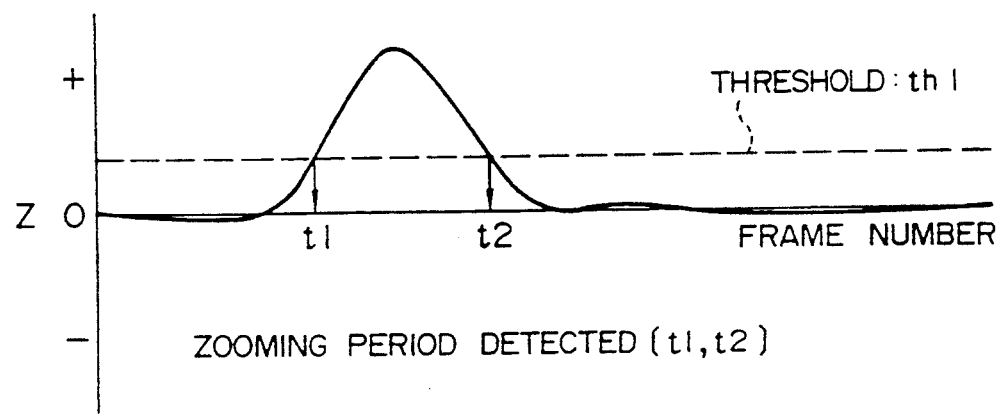
FIG. 17 is a diagram for explaining the principle of detecting a zooming period.

On the other hand, how to detect a zooming period is shown in FIG. 17, in which, as in FIG. 16, a horizontal axis denotes frame number and a vertical axis denotes the value of the motion parameter Z in the motion description table 18. With respect to such a camera zooming period as shown in FIG. 17, a positive threshold value th2 is set and a zooming period is obtained by finding a period exceeding the threshold th2. In FIG. 17, a camera zooming period corresponds to a period [t1, t2]. Conversely, when the camera is zooming out, there can be obtained such a Z characteristic diagram as to swell toward its minus side in FIG. 17, in which case a minus threshold value th2 is set and a zooming-out period is obtained by finding a period smaller than the threshold. The start and end frame numbers of thus-obtained zooming-in and zooming-out periods are written in corresponding terms in columns Zoom (Z) "+" and "−" respectively.

Through the aforementioned operations, the detecting operation of the camera work of FIG. 2 is completed.

After the data of various camera works with respect to a predetermined video image are described in the camera work description table, when a command for retrieving frames subjected to, e.g., a panning or zooming camera work is entered into the central processing unit through an operator command terminal (not shown), the central processing unit 15 searches the corresponding frames in the motion description table 18 of the main memory 16. When finding the corresponding data indicative of the above camera work in the DX, DY or Z through its searching operation, the central processing unit 15 reads out the start and end frames of the camera work. Then the central processing unit 15 reads out video images for the corresponding start and end frames corresponding to associated one of the video image camera works stored in the magnetic disk 17 as well as frames having numbers storing associated one of icons of the icon picture image file 21 of the magnetic disk unit 17 corresponding to the camera work, and then displays the picture image and icon (as a scene icon) as overlapped on the display 20.

Specific examples of the above display will be explained in the following.

FIGS. 18A to 18D show examples respectively when an arrow is displayed as overlapped on an icon indicative of a motion picture image scene with use of panning or zooming information.

Figure 18A:
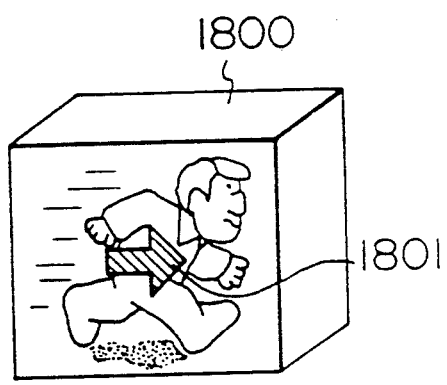
FIGS. 18A to 18D are exemplary scene icons to be combined with a picture image.
Figure 18B:
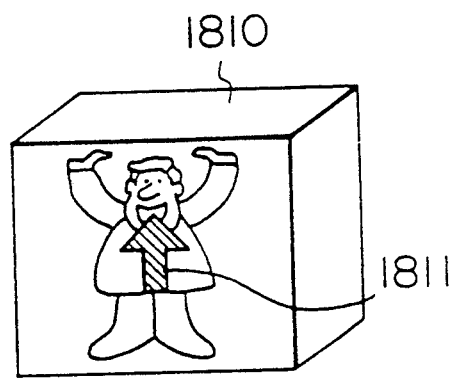
Figure 18C:
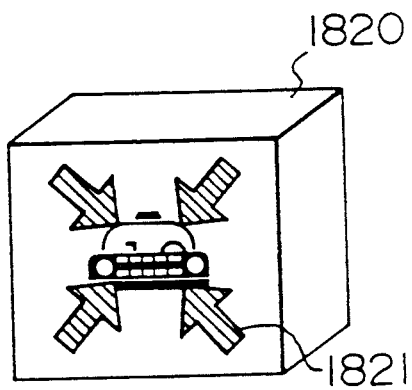
Figure 18D:
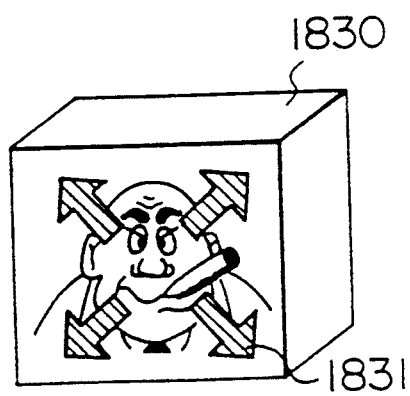

More specifically, in FIG. 18A, a scene icon 1800 shows a scene that the camera is panning from left to right. An arrow 1801 is pointed in the right direction. In FIG. 18B, a scene icon 1810 shows a scene that the camera is panning from bottom to top and an arrow 1802 is pointed in the upward direction. In FIG. 18C, a scene icon 1820 shows a scene that the camera is zooming in and four arrows 1821 are directed radially to converge toward the center of the icon. In FIG. 18D, a scene icon 1830 shows a scene that the camera or scene is zooming out and four arrows 1831 are directed radically to disperse from the center of the icon.

When the data of a camera work is converted into a predetermined arrow utilizing the above motion description table 18 and the camera work description table 19 and the arrow is displayed as overlapped on the corresponding scene icon in such a manner as mentioned above, since the user of the system can readily understand the contents of the camera work only by looking at such scene icons as shown in FIG. 18, quick retrieval of the motion picture image can be realized.

In this way, on the basis of the motion description table 18 and the camera work description table 19 showing the data of camera works, the camera work detection system of the present embodiment can support such a motion-picture image retrieving work, for example, as "want to see a scene that panning is carried out from right to left" or "want to see a scene immediately after zooming up" or such a motion-picture image editing work as, for example, "want to correct the irregular panning speed" or "want a higher panning speed". Further, such a camera work detecting operation is possible that the data of camera works are not described in the motion description table 18 but motion vector quantities for such camera works such as panning and zooming works ar previously designated and detection of a camera work is carried out by comparing the motion vector of an input motion picture image with the previously designated ones.

As has been explained in connection with FIGS. 1 to 15, in accordance with the camera work detection method of the present embodiment, such a camera work as a panning or zooming work can be automatically described on every frame basis. In this case, since the motion vector is detected in the form of a multiplicity of blocks, statistically abnormal motion vectors can be previously eliminated and thus the description contents can be enhanced in reliability. Further, motion parameters are integrated for each frame so that, even when a camera work is carried out at a slow speed, the system of the present invention can detect the motion parameters. Furthermore, for the purpose of realizing a high-speed processing, an input picture image may be reduced or decimated in size to about ¼, for example, at the time of processing the input picture image. In this case, since a detection accuracy becomes rough, when a motion corresponding to more than 8 picture elements are not present between frames, the motion cannot be detected on the decimated picture image. However, the integrating operation is carried out for each frame and thus at least a motion can be detected during the integrating operation of 8 frames. Accordingly, even when an ordinary work-station is employed, the system of the invention can describe the camera works of motion picture images at a practical speed.

In accordance with the foregoing embodiment of the present invention, such camera works such as panning and zooming motions can be accurately detected even when a moving object appears on the screen, even the use of an ordinary workstation enables high-speed detection and description of the motions, and the description data of the camera works can be effectively utilized, at the time of video editing, as the data necessary for retrieval of a motion picture image and for adjusting work of the panning speed, thus improving the picture-image editing operation.

What is claimed is:

1. A camera work detecting method comprising the steps of:

inputting a motion picture image constituted by a plurality of consecutive picture images on every frame basis and on time series basis and on the basis of a correlation value for a displacement between said frames at a typical point determined for each of small blocks constituting said motion picture image, detecting a motion vector for each of said small blocks;

generating a first motion parameter for estimation of a motion of a camera with use of either one of the motion vector detected at corresponding one of said typical points of first one of said frames and a combination of said motion vector and a position vector at corresponding one of the typical points of a second frame inputted previous by one frame to said first frame;

finding said first motion parameters for said respective frames and integrating the found first motion parameters until an integrated value exceeds a predetermined allowable value;

averaging said integrated value through an integration period and calculating a second motion parameter for determination of said camera motion for the integration period; and detecting said camera motion on the basis of said second motion parameter.

2. A camera motion detecting method as set forth in claim 1, wherein one of said small blocks of the picture image of said second frame having a non-uniform image pattern is used as a standard dictionary, a pattern coinciding with the pattern of said standard dictionary is found in the vicinity of one of said small blocks in said first frame corresponding to the standard dictionary, and said motion vector is detected on the basis of a difference between a position of said found pattern in said first frame and a position of said standard dictionary in said second frame.

3. A camera motion detecting method as set forth in claim 2, wherein said difference between the position of said found pattern in said first frame and the position of said standard dictionary in said second frame is found on the basis of a given position in the pattern of said standard dictionary as a reference point.

4. A camera work detecting method as set forth in claim 1, wherein said first motion parameter for estimation of the motion of said camera is found with use of the motion vector detected at corresponding one of said typical points of first one of said frames by finding statistical deviations of directions and magnitudes of the motion vectors at the respective typical points determined for the respective small blocks, by calculating an average of said typical point motion vectors having the deviations within a predetermined allowable range and by finding a motion parameter of said first motion parameters associated with rotation motion around a horizontal or vertical axis of said camera with use of said average motion vector; and said first motion parameter for estimation of the motion of said camera is found with use of said combination of said motion vector and the position vector at corresponding one of the typical points of said second frame inputted previous by one frame to said first frame, by extracting ones of the motion vectors having directions included in a predetermined allowable range in which a directional difference between each motion vector and the associated position vector at the typical point of each small block is within said predetermined allowable range, by calculating inner products of said extracted motion vectors and unit vectors of said associated position vectors, by normalizing values corresponding to additions of said inner products and magnitudes of said position vectors with use of the magnitudes of said position vectors to find photographing magnifications, by finding a statistical deviation of said found photographing magnifications, by calculating an average of ones of the photographing magnifications having the deviations within a predetermined allowable range, and by finding parameters indicative of a lens motion of said camera with use of said average photographing magnification.

5. A camera work detecting method as set forth in claim 4, wherein said second motion parameter based on said first motion parameter indicative of a rotation motion of said camera as well as said second motion parameter based on said first motion parameter indicative of a lens motion of said camera are respectively separately registered in different tables with respect to different frames, and the motion of said camera is detected on every frame basis by retrieving said tables.

* * * * *